Patented Oct. 17, 1950

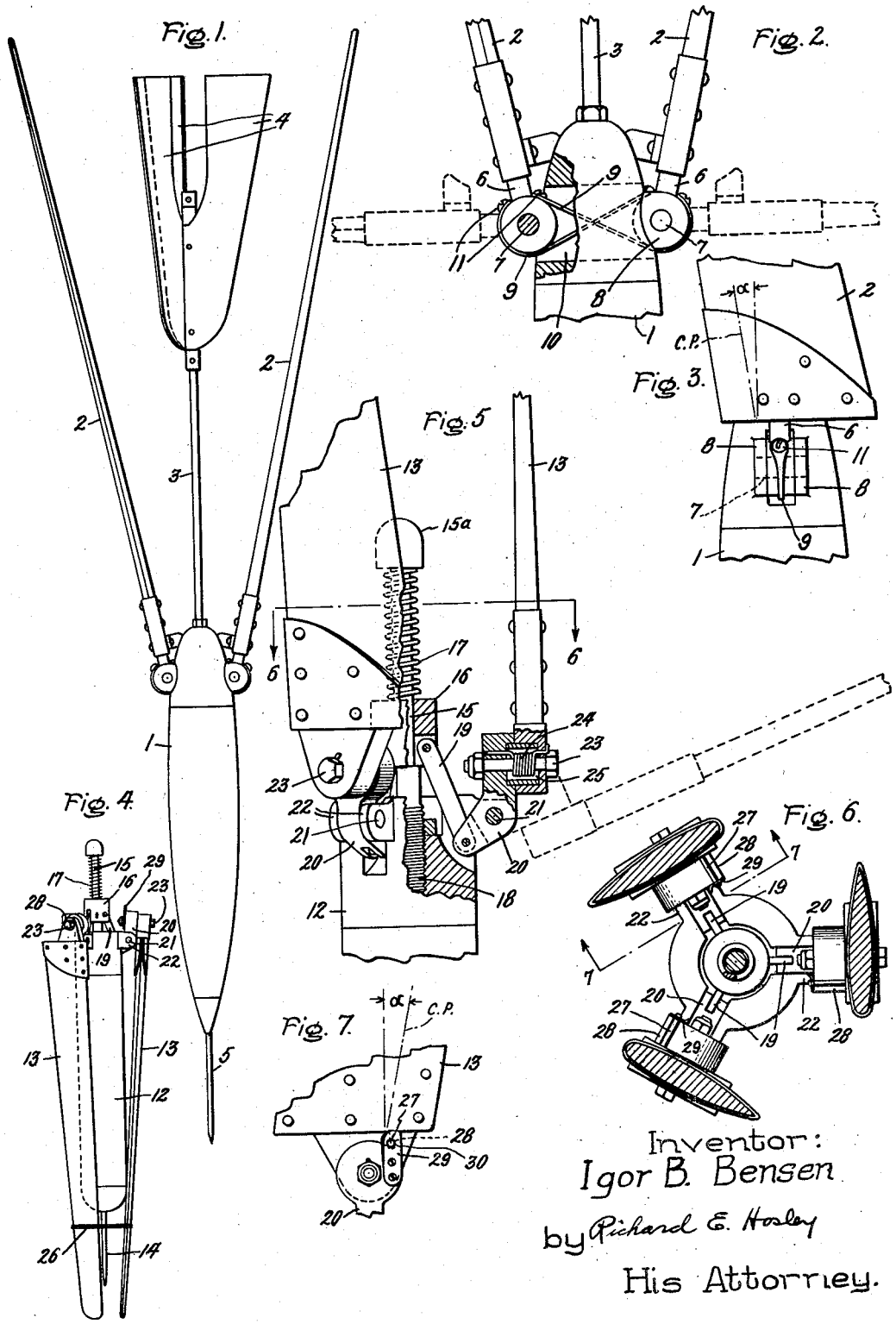

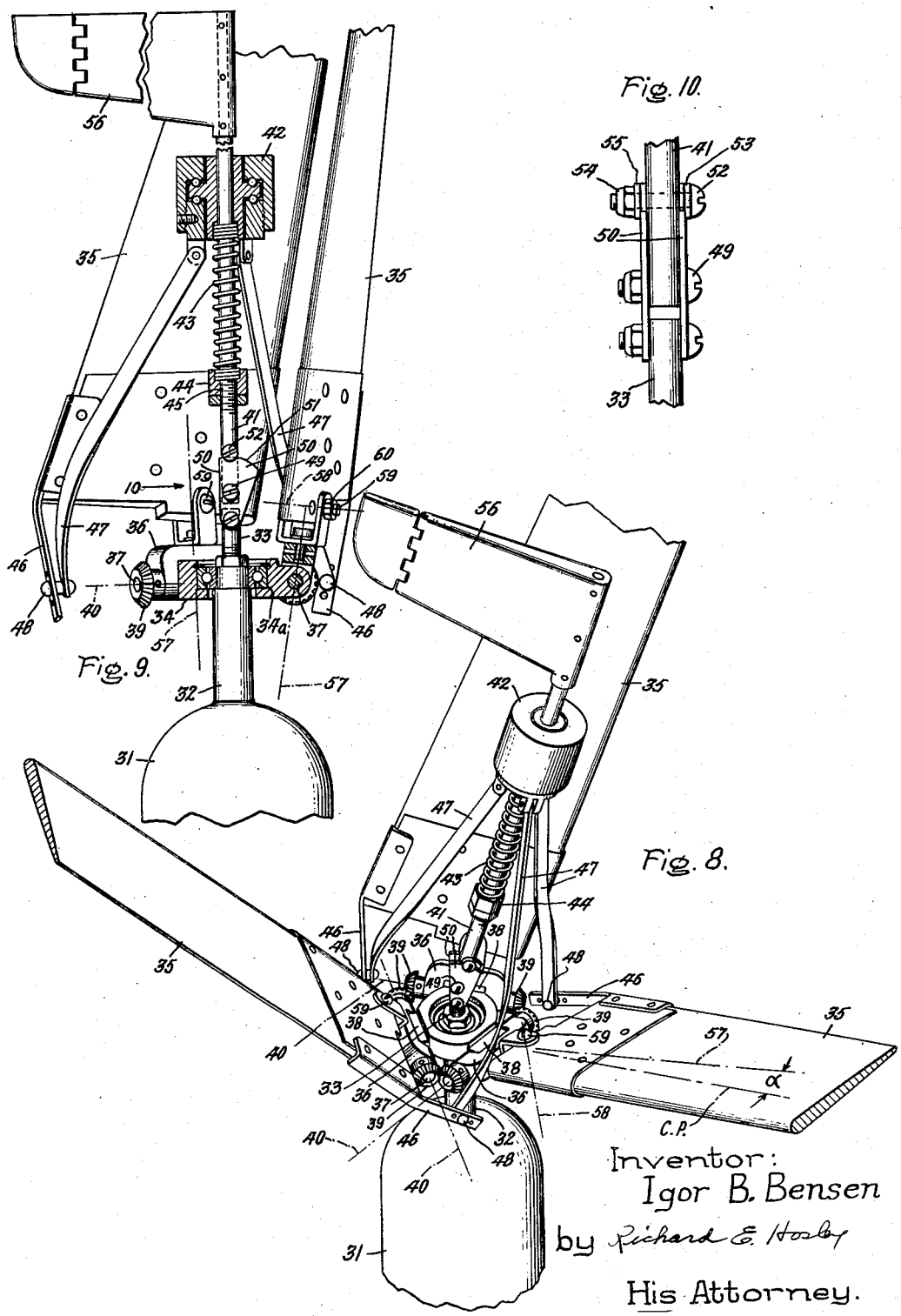

2,526,451

UNITED STATES PATENT OFFICE 2,526,451

ROTARY WING PARACHUTE AND CONTROLS

Igor B. Bensen, Alplaus, N. Y., assignor to General Electric Company, a corporation of New York Application August 18, 1948, Serial No. 44,911

25 Claims. (Cl. 244—138)

My invention relates to a rotary wing parachute and a system of controls for operating said rotary wing parachute, and more particularly to a rotary wing parachute for use in recovery of high altitude supersonic missiles or parts of missiles. This rotary wing parachute will be referred to on occasion as a "rotochute."

High altitude rockets are now capable of reaching altitudes of over 100 miles. Still higher altitudes are expected to be reached in the future. These rockets offer an opportunity for exploring altitudes never before reached, but the value of this opportunity has been reduced by the difficulty of recovering test instruments and test records.

Furthermore, only limited information lends itself to be telemetered to the ground while missiles are in flight. Bacteriological studies, for instance, are definitely in a class where recovery of test samples is essential. Research on such subjects as mutuation of animal species, chemical sampling of the upper atmosphere, investigation of cosmic rays, etc. all require a successful recovery of instruments, samples, records, etc. An object dropped from an altitude of 100 miles or more descends, through the greater part of its trajectory, in air too thin to offer appreciable drag. In the last few miles of the object's trajectory, air density increases rapidly and it is within this relatively thin layer of air that the energy of the fall must be dissipated.

The tremendous forces exerted on the ordinary parachutes when they reach the denser air at supersonic speeds have ruptured them during the opening shock. A special multiple stage ribbon parachute has been developed and tested recently with some success, from altitudes as high as 50 miles. However, it is open to question whether this technique will be useful for greater altitudes which will produce even higher speeds as well as corresponding stagnation temperatures high enough to sublime or melt parachute fabrics.

The first rotary wing recovery device was probably the seed of a Maple tree. This device has been successful in slowly lowering maple seeds from trees to ground for thousands of years. During World War II, a single leaf rotating vane parachute was developed with some success. Unfortunately, however, this type of rotating vane parachute was found inoperative whenever compressibility effects were present.

I have successfully developed a multiple bladed rotating wing parachute for the purpose of effecting recovery of aerial jetsam. One of the problems presented in the development of a rotary wing air-chute or air-brake is that of stabilizing and orienting the attitude of fall of the rotochute and its payload. Another problem arises in that if the pitch of the rotochute's blades is too negative, the blades will rotate at a very high R. P. M., centrifugal force will open the blades until they are almost perpendicular to the axis of rotation, and the rotochute will oscillate or spiral during its descent. If pitch is too positive, rotational speed is low, lift or axial drag is below normal, and sinking speed is unduly high.

Thus, one object of this invention is to provide a device that will serve as a satisfactory airbrake for use in lowering, without damage, a group of instruments and records, or delicate equipment, from a great altitude to ground.

Another object of this invention is to provide a rotating blade parachute device which will operate at supersonic speeds or whenever compressibility effects are present.

A further object of this invention is to provide means for stabilizing and orienting the attitude of fall of the rotochute and its payload.

Another object is to provide means of controlling the coning angle of the rotochute and the pitch of the rotating blades.

Further objects and advantages of my invention will become apparent as the following description proceeds and the features of novelty which characterize my invention will be pointed out with particularity in the claims annexed to and forming a part of this specification.

The coning angle is defined as the angle between the blades and the plane perpendicular to the axis of rotation of the blades. The complementary coning angle is the angle between the axis of rotation and the blades.

In the drawings,

Fig. 1 shows one form of the recovery device embodying elements of my invention. The species shown has two lifting blades and a three-finned stabilizing rudder.

Fig. 2 shows in detail the means employed to make the blades of the device shown in Fig. 1 spread or fold simultaneously and identically.

Fig. 3 is a side view of Fig. 2.

Fig. 4 is another form of the recovery device embodying elements of my invention. The species shown has 3 blades fixedly mounted and no stabilizing rudder.

Fig. 5 is a partially broken away detailed view of the blade controls of the device shown in Fig. 4.

Fig. 6 is another view of Fig. 5 taken at section 6—6 shown in Fig. 5.

Fig. 7 is part of the sectional view 7—7 shown in Fig. 6.

Fig. 8 is another form of the recovery device embodying elements of my invention. The device shown has 3 blades rotatably mounted and a stabilizing fin.

Fig. 9 is another view of the device in Fig. 8 showing more clearly some of the structural details.

Fig. 10 is a partial enlarged view looking in the direction of arrow 10 shown in Fig. 9 and more clearly shows elements of the cyclic pitch control.

In Fig. 1, I have shown a rotary wing parachute retrieving device consisting of a body of revolution such as housing 1 within which is housed the instruments and data that is to be retrieved. Housing 1 is preferably constructed to be symmetrical such that its longitudinal axis coincides with its axis of rotation. At substantially one end of the housing, I have shown the rotary wing system consisting of blades 2 swept forward at their center of pressure lines and trailing backward from the body 1. Mounted on the same end of the housing, I have shown a shaft 3 whose axis is coaxial with the longitudinal axis of the housing and attached to shaft 3 are a plurality of stabilizing fins 4. At the opposite end of the housing is a spike 5 whose purpose is to act as a shock absorber for the missile. As shown in detail in Fig. 2, each blade 2 is mounted to the housing 1 on hinges whose axes are located in a plane perpendicular to the longitudinal axis of the housing. Each blade 2 has an eye-like member 6 attached to it at the root section, and each eye-like member 6 is rotatably mounted upon a shaft 7. Each shaft 7 is supported by a pair of ears 8 which are fixedly fastened to the body of revolution 1. Inelastic flexible bands 9 join the eye-like member 6, each to the other in such a manner that the motion of one of the blades rotating on its shaft 7 produces simultaneous and identical movement of the other blade about its shaft 7. These bands 9, pass through a passageway 10 located in body 1. Fig. 3 shows more clearly a screw 11 which fastens the inelastic flexible band 9 to member 6.

Fig. 3 also clearly shows the sweep forward angle of the blades. The sweep forward angle (or alpha as it is denoted in the accompanying drawings) lies in the plane of the cord lines of the blade and is the angle between a spanwise running line which goes through the center of pressure of the blade and a line which is perpendicular to the direction of motion of the blade. This swept forward nature of the center of pressure of each blade may also be defined with relation to the blade hinge axis. When defined from this viewpoint, the resultant center of pressure of each blade is located ahead of a radial line extending perpendicular to the blade hinge axis from the axis of rotation of the body 1. The center of pressure of a blade is usually found to be between 25% to 30% of the cord line back of the leading edge of the blade.

The three dimensional combination of the complementary coning angle and the forward sweep angle of the blades has a corkscrew action in axial flow, regardless of whether the flow is subsonic or supersonic. Because of this corkscrew effect, the blades are forced by their own geometry to revolve in the airflow and no additional boosters are needed. As the rotor R. P. M. increases, the centrifugal force on the blades increases and as a result the blades fan out to a greater complementary coning angle, thus increasing the drag and slowing down the rate of descent of the missile. As the missile slows down the R. P. M. of the rotor decreases, the coning angle increases and the rate of descent once again increases. This hunting continues until a point of equilibrium is reached at which all the variables such as rate of descent, R. P. M., coning angle, and drag are satisfied.

It is pointed out that as the coning angle of a swept forward blade is varied, the apparent pitch of the blade is simultaneously varied. The variation is such that as the coning angle increases the pitch decreases. The decrease of pitch tends to increase the R. P. M. of the blade and the resultant centrifugal force on the blades tends to further reduce the coning angle. The point of stability of this system has been found to be at a very low coning angle of about $+2°$.

The form of my invention shown in Figs. 1 to 3 is a two-bladed rotochute in combination with guide vanes for stabilizing the entire device as it falls. The blades are fixedly mounted on the body and this means that the body rotates with the blades during the fall.

Fig. 4 shows a rotary wing parachute retrieving device having a body of revolution such as housing 12 which houses the payload. Mounted at one end of the housing 12 substantially coaxial with the longitudinal axis thereof are three air foil type blades 13, and at the opposite end of the housing is a spike 14 which acts as a shock absorber for the absorption of the impact of the missile with the earth. As shown more clearly in Fig. 5, the end of the body 12 at which the air foil type blades are located, has mounted on it a shaft 15 mounted coaxially with the axis of body 12. Mounted concentrically with the shaft 15 but being free to move in an axial direction along the shaft is a coordinating piece 16. This piece 16 cooperates with one end of a spring 17, the other end of spring 17 cooperating with knob 15a attached to shaft 15. Shaft 15 is threaded 18 to some part of the structure of body 12 so as to provide a means for adjusting the force in the spring 17. The spring force of spring 17 can be so set as to bias the blades 13 to the desired complementary coning angle. The coordinating piece 16 is linked by means of links 19 to members 20. Members 20 are rotatably mounted on shafts 21 which are supported by ears 22 which in turn are fixedly fastened to the body of revolution 12 in a plane perpendicular to the axis of rotation thereof. The other end of each member 20 is fastened to its corresponding blade 13. Blades 13 are fixed to members 20 in a manner that permits the blades to be folded into a position as shown in Fig. 4. This is accomplished by rotatably mounting each blade 13 on a bolt 23 which passes through both blade 13 and pivot member 20. A spring means 24, mounted concentrically with bolt 23 and in a recess 25, provides a restoring force that returns the blades from the folded position shown in Fig. 4 to the position shown in Fig. 5 upon release of the means for holding the blades in the position shown in Fig. 4. In Fig. 4, such a means are shown as a thread or band and is designated as numeral 26. Each blade 13 has attached to it a finger 27 which cooperates with a stop 28 located on the periphery of member 20 in such a way as to fix the position of the blade after it has been released from the position shown in Fig. 4. To prevent a tendency of the blade to rotate back toward the direction from which it unfolded, a perforated spring member 29 best seen in Figs. 6 and 7 is provided which captures finger 27 within a hole 30, and prevents movement of the blade away from the desired position.

The form of my invention shown in Figs. 4 to 7 is a three-bladed rotochute with no guide vanes for stabilization. This device has folding type blades and when stored appears in the form shown in Fig. 4. Moreover, this three blade rotochute device is constructed to have its center of gravity located forward of its center of pressure. As the rotochute is thrown from the rocket or airplane housing it, a device, neither shown or claimed, either ruptures or removes the means 26 that restrains the blades to a folded position. As soon as means 26 is removed, the springs 25 shown in Fig. 5 rotate the wings into the position shown in Fig. 5 whereupon these wings cooperate with the center of gravity placed forward of the center of pressure of the device to orient the missile in a nosedown direction. As hereinabove described, the complementary coning angle and the sweep forward angle of the blades cooperate to cause the blades to rotate. Since the blades are not rotatably mounted the body also rotates with the blades. As the centrifugal force on the blades is increased due to the increasing R. P. M., the blades spread, and because of their negative pitch angle they autorotate at an increasing R. P. M. until the blades are nearly perpendicular to the axis of rotation. As the blades fan out to a low coning angle, the intercepted area of the blades approaches a maximum, the amount of drag increases, and the velocity of the device decreases. The final coning angle is a function of both the R. P. M. of the rotating blades and the rate of change of descent velocity.

In Fig. 8, I have shown a rotary wing parachute retrieving device consisting of a housing of revolution 31 for enclosing the payload and mounted on one end of and coaxial with said body of revolution 31 is a shaft 32 and an extension thereto designated as shaft 33. Rotatably mounted on shaft 32 is a spider 34 to which are fastened three-air-foil shaped blades 35. The spider 34 is fixedly mounted on the outer race 34a of a bearing. The blades 35 are fixedly mounted by means of clevis type members 36 on shafts 37. Each shaft 37 is rotatably supported in a collar 38 which is fixedly fastened to spider 34. Mounted on the end of each shaft 37 are bevel gears 39 which cooperate with identical bevel gears mounted on the ends of the other shafts in such a manner that movement of any blade 35 about the axis 40 of its corresponding mounting, shaft 37, results in simultaneous and identical motion of all the other blades 35 about their axes 40. Mounted with its axis coinciding with that of shaft 33 and trailing back of shaft 33 is another shaft 41 upon which is concentrically mounted a mass 42. This mass 42 is fixedly fastened to one end of spring 43 which is mounted concentrically on shaft 41. The other end of spring 43 is fixedly fastened to stop 44 which is threaded 45 to shaft 41, thus providing a means of adjustment for increasing or decreasing the initial spring force within spring 43. Attached to the trailing edge of each blade 35 at the root section is a member 46 and attached to each member 46 is another member 47 which is pivotally fastened at its other end to the mass 42. However, each point 48 is located so that it does not lie in the same line with its corresponding axis 40.

Shaft 41 is mounted to be rotatable about member 49 and a means for providing resistance to motion about the axis of member 49 is shown in detail in Fig. 10. Mounted on shaft 33 are a pair of plates 50 whose contour 51 is so shaped as to be equidistant from the center line of member 49. Under the head of bolt member 52 is a washer 53 and under the nut 54 corresponding to bolt 52 is a second washer 55. Both washers bear on the corresponding plates 50 and by adjusting the pressure exerted, by tightening the bolt, one can impart a certain amount of resistance to the motion of shaft 41 about the axis of member 49. Mounted on the trailing end on shaft 41 is a stabilizing fin 56.

Each blade 35 is so mounted as to be rotatable about three separate axes. The blades are rotatable about axes 40 lying in the plane of the race to which the blades are attached. Rotation about these axes results in change of coning angle. The blades are further rotatable about axes 57 perpendicular to the axes mentioned above. These axes 57 run spanwise with each blade intercepting the root section of each blade at about the center of pressure point and in the region between the mean camber line and the cord. Rotation of the blade about this set of axes results in change of pitch or angle of attack of the blades. The third set of axes 58 are perpendicular to the planes formed by the other two sets of axes 40 and 57 and are located at approximately the center of pressure point of each blade near the root section. Rotation of the blades about these axes changes the sweepforward angle of the blades. It will be noted that axis 58 is the center line of a nut 59 and bolt 60 combination. The appropriate sweep forward angle of the blade can be preset and by tightening the nut and bolt the sweep forward angle is fixed.

The form of my invention shown in Figs. 8 to 10 is a three-bladed rotochute with no guide vanes for stabilization during free fall and with the wing device rotatably mounted. The blades of this rotochute do not fold forward but extend rearward spanwise and since the blades are rotatably mounted, they alone rotate. When the device is thrown into the atmosphere and begins its free fall, the rearward spanwise extending blades act as guide vanes providing stabilizing forces about a plurality of axes. These stabilizing forces cooperating with a center of gravity placed forward of the center of pressure of the device orients the missile into a nosedown direction. As described above, the complementary coning angle of the blades and the sweep forward angle of the center of pressure lines of the blades combine to give a corkscrew type configuration to the blades and the passage of air relative to the blades in this corkscrew type configuration gives rise to forces which cause the blades to start rotating. As the centrifugal force on the blades is increased due to the increasing R. P. M. the blades spread thus decreasing the coning angle. As the coning angle decreases, the amount of drag increases and the velocity of the device decreases. Mass 42 acts as a governor mechanism in the following manner. As the blades 35 fan out to a very small coning angle, the pitch of the blades is very low and, although the drag is very high, the rotational speed is very high. Because the pitch of the blades is low, the rotational speed keeps increasing, as does the centrifugal force. If the centrifugal force is not kept below certain critical values the blades will be torn loose. Inasmuch as the drag is a function of the speed of rotation of the blades, it is desirable to use that relationship in the design of a governor. As the drag increases, the deceleration of the missle tends to increase the apparent weight of mass 42. The deceleration may be of the order of 10g to 40g. The apparent weight of mass 42 reacts with spring 43 to move the mass along shaft 41 resulting in corresponding movement of points 48. This movement of points 48 results in rotation of the trailing edges of blades 35 about their respective axes 57 in such a manner that the pitch of the blades is made positive. When the pitch of the blades is made positive, autorotation can no longer be maintained and the R. P. M. is reduced. As the R. P. M. is reduced, the coning angle increases reducing the effective drag area and the resultant drag. This reduces the apparent weight of mass 42 and spring 43 now pushes it back along shaft 41, simultaneously raising points 48. This results in the changing of pitch in the negative direction and autorotation once again begins. The entire process then repeats. In this way, the great initial velocity is reduced but the mechanism is governed as to the rate of decrease to conform with the structural limits of the device.

As a blade 35 is rotated about its axis 40, it will be noted that since point 48 does not lie on axis 40 some other relative motion will take place. Since blade 35 is inelastic, each element of the blade lying at a fixed distance from the axis of rotation 40 must move the same distance. Since the distance from each point lying a fixed distance from axis 40 to the center of rotation of that point is not the same, and although equal distances are traversed by these points by rotation of the blade, equal arcs are not traversed. To compensate for this variation in rotation, the blade 35 further rotates simultaneously about axis 57 resulting in a change of pitch of the blade. Thus, variation of the coning angle of the blade results in simultaneous variation in pitch of the blades.

To change the cyclic pitch of the rotating blades, shaft 41 is rotated about the axis of bolt 49. But this results only in the change of direction of the resultant force of the blades with respect to the axis of the body 31. In order to direct the path of the missile, a couple must be provided and so a transverse force is made available through the use of stabilizing fin 56.

In general operation, records, instruments, data and test samples to be recovered are enclosed in the body of the rotochute. The rotochute is carried aloft within a high altitude rocket or aircraft. At the peak altitude, or at any other desired point, the rotochute is expelled from the rocket or aircraft and begins a free fall separate from that of the mother projectile. Upon reaching air of appreciable density, the trailing blades of the rotary wing airbrake and the tail fins will be subjected to aerodynamic forces which, cooperating with a center of gravity located forward of the center of pressure of the device, will orient the projectile into a nose-down position, and the airstream flowing past the blades will start the blades rotating.

It is believed that by virtue of the very small coning angle of the blades in their trailing position, the blades are acting in subsonic flow even though the missile is moving at supersonic speeds because the small coning angle puts the blades behind the boundary of supersonic flow, the Mach cone. As the blades begin to revolve, centrifugal force gradually spreads the blades and brings them out to some new coning angle. The blades of a rotating wing projectile in autorotative descent, normally have little or no pitch. Yet, the rotation of the blades when once begun is maintained by the relative motion of the air. To begin rotation of the rotary wing air-brake, the blades are folded back along the axis of rotation, but not quite parallel to it. A residual complementary coning angle is maintained between the plane of the blade and the axis of rotation. The three dimensional arrangements of the complementary angle and the forward sweep angle of the blades has a corkscrew action in axial flow, regardless of whether the flow is subsonic or supersonic. Because of this corkscrew effect, the blades are forced to revolve in the airflow by their own geometry and need no additional boosters. Once the rotor R. P. M. is high enough to build up sufficient centrifugal force the blades gradually fan out until the desired coning angle is attained.

A falling rotochute must orient itself nose first into the airstream so that its axis is substantially parallel to the direction of its motion before normal rotation and blade opening can occur. Therefore, with the blades folded, the center of gravity must be sufficiently ahead of the center of pressure for such orientation to occur. The folded blades of a two-bladed rotochute are fully effective as stabilizing fins about one transverse axis only. Therefore in the two-bladed type rotochute, guide vanes are provided to give orientation stability about any axis.

In rotochutes of three blades and more sufficient fin area and stability planes are provided to insure the correct fall orientation of the missile. Thus, in rotochutes having three or more blades, tail fins and guide vanes are eliminated.

While I have shown a particular embodiment of my invention, it will be understood, of course, that I do not wish to be limited thereto since many modifications may be made, and I therefore contemplate by the appended claims to cover any modifications as fall within the true spirit and scope of my invention.

What I claim as new and desire to secure by Letters Patent of the United States is:

1. A rotary wing parachute retrieving system comprising a housing having a forward end and a rearward end, a rotary wing device coupled to the rearward end of said housing mounted substantially coaxial with the longitudinal axis of said housing, said rotary wing device comprising a plurality of blades swept forward at their centers of pressure, said blades being hinged and normally folded to an initial complementary coning angle and extending rearwards spanwise from hinges whose axes are located in a plane perpendicular to the axis of said housing, means for interconnecting said blades so that identical and simultaneous rotation of all the blades about said hinge axes occurs, said device having an axis of rotation, and means for orienting said device during its free fall so that the axis of rotation of the device is substantially parallel to the direction of relative air flow.

2. A rotary wing parachute retrieving system comprising an elongated housing having a forward end and a rearward end, a rotary wing device coupled to the rearward end of said housing mounted substantially coaxial with the longitudinal axis of said housing, said rotary wing device comprising a plurality of blades swept forward at their centers of pressure at an angle of between 1° and 20°, said blades being hinged and normally folded to an initial complementary coning angle of between 1° and 20° and extending rearwards spanwise from hinges whose axes are located in a plane perpendicular to the axis of said housing, means for interconnecting said blades so that identical and simultaneous rotation of all the blades about said hinge axes occurs, said device having an axis of rotation, and stabilizing means axially extending from the rearward end of said housing for orienting said device during its free fall so that the axis of rotation of said device is substantially parallel to the direction of relative air flow.

3. A two-bladed rotary wing parachute device retrieving system comprising a housing having a forward end and a rearward end, a pair of shafts, whose axes are located in a plane perpendicular to the axis of said housing, fixedly mounted on said housing and symmetrically disposed about the axis of said housing, a pair of blades fastened to members rotatably mounted on said shafts, means for interconnecting said members so that identical and simultaneous rotation of the blades about said shaft axes occurs, said blades being swept forward at their centers of pressure and extending rearwards spanwise at an initial complementary coning angle, said device having an axis of rotation substantially coincident with the axis of said housing, and means axially extending from the rearward end of said housing for orienting said device during its free fall so that the axis of rotation of the device is substantially parallel to the direction of relative air flow.

4. A two-bladed rotary wing parachute device retrieving system comprising a housing having a forward end and a rearward end, a pair of shafts, whose axes are located in a plane perpendicular to the axis of said housing, fixedly mounted on said housing and symmetrically disposed about the axis of said housing, a pair of blades fastened to members rotatably mounted on said shafts, means for interconnecting said members so that identical and simultaneous rotation of the blades about said shaft axes occurs, said blades being swept forward at their centers of pressure and extending rearwards spanwise at an initial complementary coning angle, a shaft mounted on the rearward end of said housing coaxially with the axis of said housing, a plurality of fins mounted on said shaft, said device having an axis of rotation substantially coincident with the axis of said housing, and means for orienting said device so that the axis of rotation of the device is substantially parallel to the direction of relative air flow, and means attached to the forward end of said housing for absorbing the high deceleration forces impressed upon said device during its landing.

5. A two-bladed rotary wing parachute device retrieving system comprising a housing having a forward end and a rearward end, a pair of shafts, whose axes are located in a plane perpendicular to the axis of said housing, fixedly mounted on said housing and symmetrically disposed about the axis of said housing, a pair of blades fastened to members rotatably mounted on said shafts, said housing forming a passageway through which passes means comprising flexible inelastic bands for interconnecting said members upon which said blades are mounted so that identical and simultaneous motion of both blades occurs, said blades being swept forward at their centers of pressure at an angle of between 1° and 20° and extending rearwards spanwise at an initial complementary coning angle of between 1° and 20°, a shaft mounted on the rearward end of said housing coaxially with the axis of said housing, a plurality of fins mounted on said shaft, said device having an axis of rotation and having a center of gravity which is located forward of the center of pressure of said device and which cooperates with air resistant members comprising said normally folded blades and said fins to orient the entire device during its free fall so that the axis of rotation of the device is substantially parallel to the direction of relative air flow.

6. A two-bladed rotary wing parachute device retrieving system comprising a housing having a forward end and a rearward end, a pair of shafts, whose axes are located in a plane perpendicular to the axis of said housing, fixedly mounted on said housing and symmetrically disposed about the axis of said housing, a pair of blades fastened to members rotatably mounted on said shafts, said housing forming a passageway through which passes means comprising flexible inelastic bands for interconnecting said members upon which said blades are mounted so that identical and simultaneous motion of both blades occurs, said blades being swept forward at their centers of pressure at an angle of between 1° and 20° and extending rearwards spanwise at an initial complementary coning angle of between 1° and 20°, a shaft mounted on the rearward end of said housing coaxially with the axis of said housing, a plurality of fins mounted on said shaft, said device having an axis of rotation and having a center of gravity which is located forward of the center of pressure of said device and which cooperates with air resistant members comprising said normally folded blades and said fins to orient the entire device so that the axis of rotation of the device is substantially parallel to the direction of relative air flow, means comprising said initial coning angle cooperating with said sweep forward angle of the blades whereby air forces are impressed upon the blades during said device's oriented fall which causes said blades to autorotate, and means comprising a spike-like member attached to the forward end of said housing and extending in a forward direction for absorbing the high deceleration forces impressed upon said device during its landing.

7. A multi-bladed rotary wing parachute device retrieving system comprising a housing having a forward end and a rearward end, a plurality of shafts, whose axes are located in a plane perpendicular to the axis of said housing, fixedly mounted on said housing and symmetrically disposed about the axis of said housing, a plurality of blades fastened to members rotatably mounted on said shafts, said blades being swept forward at their centers of pressure and extending rearwards spanwise at an initial complementary coning angle, interconnecting and biasing means for interconnecting said rotatably mounted members so that simultaneous and identical variation of coning angle of all the blades occurs and for biasing the blades to said initial complementary coning angle, said device having an axis of rotation substantially coincident with the axis of said housing, and means for orienting said device during its free fall so that the axis of rotation of the device is substantially parallel to the direction of relative air flow.

8. A multi-bladed rotary wing parachute device retrieving system comprising a housing having a forward end and a rearward end, a plurality of shafts, whose axes are located in a plane perpendicular to the axis of said housing, fixedly mounted on said housing and symmetrically disposed about the axis of said housing, a plurality of blades fastened to members rotatably mounted on said shafts, said blades being swept forward at their centers of pressure at an angle of between 1° and 20° and extending rearwards spanwise at an initial complementary coning angle of between 1° and 20°, interconnecting and biasing means for interconnecting said rotatably mounted members so that simultaneous and identical variation of coning angle of all the blades occurs and for biasing the blades to said initial complementary coning angle, said device having an axis of rotation substantially coincident with the axis of said housing, and said device having a center of gravity which is located forward of the center of pressure and which cooperates with air resistant members comprising said rearwardly extending blades to orient the entire device during its free fall so that the axis of rotation of the device is substantially parallel to the direction of relative air flow.

9. A multi-bladed rotary wing parachute device retrieving system comprising a housing having a forward end and a rearward end, a plurality of shafts, whose axes are located in a plane perpendicular to the axis of said housing, fixedly mounted on said housing and symmetrically disposed about the axis of said housing, a plurality of blades fastened to members rotatably mounted on said shafts, said blades being swept forward at their centers of pressure at an angle between 1° and 20° and extending rearwards spanwise at an initial complementary coning angle of between 1° and 20°, interconnecting and biasing means for interconnecting said rotatably mounted members so that simultaneous and identical variation of coning angle of all the blades occurs and for biasing the blades to said initial complementary coning angle, said interconnecting and biasing means comprising a shaft mounted on the rearward end of said housing coaxially with the axis of said housing, a spring engaged at one end to said shaft, a coordinating piece cooperating with the free end of said spring, said spring and coordinating piece being mounted concentrically with said shaft, and a plurality of links coupling said coordinating piece to the plurality of rotatably mounted members to which are fastened the blades, said device having an axis of rotation, and means for orienting said device during its free fall so that the axis of rotation of the device is substantially parallel to the direction of relative air flow.

10. A multi-bladed rotary wing parachute device retrieving system comprising a housing having an axis of rotation and having a forward end and a rearward end, a plurality of shafts, whose axes are located in a plane perpendicular to the axis of said housing, fixedly mounted on said housing and symmetrically disposed about the axis of said housing, a plurality of blades fastened to members rotatably mounted on said shafts, said blades being swept forward at their centers of pressure at an angle between 1° and 20° and extending rearwards spanwise at an initial complementary coning angle of between 1° and 20°, interconnecting and biasing means for interconnecting said rotatably mounted members so that simultaneous and identical variation of coning angle of all the blades occurs and for biasing the blades to said initial complementary coning angle, said device having a center of gravity which is located forward of the center of pressure and which cooperates with air resistant members comprising said rearwardly extending blades to orient the entire device during its free fall so that the axis of rotation of said housing is substantially parallel to the direction of relative air flow, means comprising said initial coning angle cooperating with said sweep forward angle of the blades whereby air forces are impressed upon the blades during said device's oriented fall which causes said blades to autorotate, and means comprising a spike-like member attached to the forward end of said housing and extending in a forward direction for absorbing the high acceleration forces impressed upon said device during its landing.

11. A multi-bladed rotary wing parachute device retrieving system comprising a housing having a forward end and a rearward end, a plurality of shafts, whose axes are located in a plane perpendicular to the axis of said housing, fixedly mounted on said housing and symmetrically disposed about the axis of said housing, a plurality of blades fastened to members rotatably mounted on said shaft, said blades being swept forward at their centers of pressure and extending rearwards spanwise at an initial complementary coning angle, interconnecting and biasing means for interconnecting said rotatably mounted members so that simultaneous and identical variation of coning angle of all the blades occurs and for biasing the blades to said initial complementary coning angle, means for folding the blades in a forward direction when not in use and for providing automatic unfolding and rigid positioning of the blades to said initial complementary coning angle and said swept forward angle upon release from said forwardly folded position, said device having an axis of rotation substantially coincident with the axis of said housing, and means for orienting said device during its free fall so that the axis of rotation of the device is substantially parallel to the direction of relative air flow.

12. A multi-bladed rotary wing parachute device retrieving system comprising a housing having an axis of rotation and having a forward end and a rearward end, a plurality of shafts, whose axes are located in a plane perpendicular to the axis of said housing, fixedly mounted on said housing and symmetrically disposed about the axis of said housing, a plurality of blades fastened to members rotatably mounted on said shaft, said blades being swept forward at their centers of pressure and extending rearwards spanwise at an initial complementary coning angle, interconnecting and biasing means for interconnecting said rotatably mounted members so that simultaneous and identical variation of coning angle of all the blades occurs and for biasing the blades to said initial complementary coning angle, means for folding the blades in a forward direction when not in use and for providing automatic unfolding and rigid positioning of the blades to said initial complementary coning angle and swept forward angle upon release from said forwardly folded position, means for orienting said device during its free fall so that the axis of rotation of said housing is substantially parallel to the direction of relative air flow, and means attached to the forward end of said housing for absorbing the high deceleration forces impressed upon said device during its landing.

13. A multi-bladed rotary wing parachute device retrieving system comprising a housing having a forward end and a rearward end, a plurality of shafts, whose axes are located in a plane perpendicular to the axis of said housing, fixedly mounted on said housing and symmetrically disposed about the axis of said housing, a plurality of blades fastened to members rotatably mounted on said shafts, said blades being swept forward at their centers of pressure and extending rearwards spanwise at an initial complementary coning angle, interconnecting and biasing means for interconnecting said rotatably mounted members so that simultaneous and identical variation of coning angle of all the blades occurs and for biasing the blades to said initial complementary coning angle, said interconnecting and biasing means comprising a shaft mounted on the rearward end of said housing coaxially with the axis of said housing, a spring engaged at one end and to said shaft, a coordinating piece cooperating with the free end of said spring, said spring and coordinating piece being mounted concentrically with said shaft, and a plurality of links coupling said coordinating piece to the plurality of rotatably mounted members to which are fastened the blades, means for folding the blades in a forward direction when not in use and for providing automatic unfolding and rigid positioning of the blades to said initial complementary coning angle and said sweep forward angle upon release from said forwardly folded position, comprising said rotatably mounted members to which said blades are fastened having a shaft passing through said member upon which the corresponding blade is rotatably mounted and through said corresponding blade, a spring mounted concentrically upon said shaft in a recess formed by said member and the blade, a finger mounted on said blade, a stop on said member for cooperating with said finger and a catch device mounted on said member for capturing and fixing in position said finger when in juxtaposition with said stop, said device having an axis of rotation, and means for orienting said device during its free fall so that the axis of rotation of the device is substantially parallel to the direction of relative air flow.

14. A multi-bladed rotary wing parachute device retrieving system comprising a housing having a forward end and a rearward end, at least three shafts, whose axes are located in a plane perpendicular to the axis of said housing, equally spaced circumferentially and similarly and rotatably mounted on a race which is rotatably and coaxially mounted on said housing, at least three blades respectively fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, said device having an axis of rotation substantially coincident with the axis of said housing, and means for orienting said device during its free fall so that the axis of rotation of the device is substantially parallel to the direction of relative air flow.

15. A multi-bladed rotary wing parachute device retrieving system comprising a housing having an axis of rotation and having a forward end and a rearward end, a plurality of shafts, whose axes are located in a plane perpendicular to the axis of said housing, equally spaced circumferentially and similarly and rotatably mounted on a race which is rotatably and coaxially mounted on said housing, a plurality of blades fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, means for orienting said device during its free fall so that the axis of rotation of said housing is substantially parallel to the direction of relative air flow, and means for varying the pitch of the blades in addition to their inherent pitch variation as their coning angle varies.

16. A multi-bladed rotary wing parachute device retrieving system comprising a housing having a forward end and a rearward end, a plurality of shafts, whose axes are located in a plane perpendicular to the axis of said housing, equally spaced circumferentially and similarly and rotatably mounted on a race which is rotatably and coaxially mounted on said housing, a plurality of blades fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, said device having an axis of rotation substantially coincident with the axis of said housing, means for orienting said device during its free fall so that the axis of rotation of the device is substantially parallel to the direction of relative air flow, and means for governing the rate of deceleration of said device and the speed or rotation of the blades.

17. A multi-bladed rotary wing parachute device retrieving system comprising a housing having a forward end and a rearward end, a plurality of shafts, whose axes are located in a plane perpendicular to the longitudinal axis of said housing, equally spaced circumferentially and similarly and rotatably mounted on a race which is rotatably and coaxially mounted on said housing, a plurality of blades fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, means for orienting said device during its free fall so that the axis of said housing is substantially parallel to the direction of relative air flow, and means comprising variation of the cyclic pitch of the blades and a guide fin for orienting said device into a selected path of descent.

18. A multi-bladed rotary wing parachute device retrieving system comprising a housing having a forward end and a rearward end, a plurality of shafts, whose axes are located in a plane perpendicular to the axis of said housing, equally spaced circumferentially and similarly and rotatably mounted on a race which is rotatably and coaxially mounted on said housing, a plurality of blades fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, said device having an axis of rotation substantially coincident with the axis of said housing, means for orienting said device during its free fall so that the axis of rotation of the device is substantially parallel to the direction of relative air flow, means for varying the pitch of the blades as their coning angle varies, and means comprising variation of the cyclic pitch of the blades and a guide fin for orienting said device into a selected path of descent.

19. A multi-bladed rotary wing parachute device retrieving system comprising a housing having a forward end and a rearward end, a plurality of shafts, whose axes are located in a plane perpendicular to the longitudinal axis of said housing, equally spaced circumferentially and similarly and rotatably mounted on a race which is rotatably and coaxially mounted on said housing, a plurality of blades fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, means for orienting said device during its free fall so that said longitudinal axis of said housing is substantially parallel to the direction of relative air flow, means for varying the pitch of the blades as their coning angle varies, and means for governing the rate of deceleration of said device and the speed of rotation of the blades.

20. A multi-bladed rotary wing parachute device retrieving system comprising a housing having a forward end and a rearward end, a plurality of shafts, whose axes are located in a plane perpendicular to the axis of said housing, equally spaced circumferentially and similarly and rotatably mounted on a race which is rotatably and coaxially mounted on said housing, a plurality of blades fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, said device having an axis of rotation substantially coincident with the axis of said housing, means for orienting said device during its free fall so that the axis of rotation of the device is substantially parallel to the direction of relative air flow, means for governing the rate of deceleration of said device and the speed or rotation of the blades, and means comprising variation of the cyclic pitch of the blades and a guide fin for orienting said device into a selected path of descent.

21. A multi-bladed rotary wing parachute device retrieving system comprising a housing having an axis of rotation substantially coincident with its longitudinal axis and having a forward end and a rearward end, a plurality of shafts, whose axes are located in a plane perpendicular to said longitudinal axis of said housing, equally spaced circumferentially and similarly and rotatably mounted on a race which is rotatably and coaxially mounted on said housing, a plurality of blades fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, means for orienting said device during its free fall so that the axis of rotation of said housing is substantially parallel to the direction of relative air flow, means for varying the pitch of the blades as their coning angle varies, means for governing the rate of deceleration of said device and the speed of rotation of the blades, and means comprising variation of the cyclic pitch of the blades and a guide fin for orienting said device into a selected path of descent.

22. A multi-bladed rotary wing parachute device retrieving system comprising a housing having a forward end and a rearward end, a plurality of shafts, whose axes are located in a plane perpendicular to the axis of said housing, equally spaced circumferentially and similarly and rotatably mounted on a race which is rotatably and coaxially mounted on said housing, a plurality of blades fastened to members mounted on said shafts, said blades being swept forward at their centers of pressure and extending rearwards spanwise at an initial complementary coning angle, means for interconnecting said shafts so that simultaneous and identical variation of coning angle of all the blades occurs, said device having an axis of rotation substantially coincident with the axis of said housing, and means for orienting said device during its free fall so that the axis of rotation of the device is substantially parallel to the direction of relative air flow, and means for governing the rate of deceleration of said device and the speed or rotation of the blades, said governing means comprising a shaft mounted in the rearward end of said housing coaxial with the axis of said housing, a spring engaged at one end of said shaft, a mass cooperating with the free end of said spring, said spring and mass being mounted concentrically about said shaft, arms coupling said mass to said blades so that movement of said mass along the shaft varies the pitch of the blades.

23. A multi-bladed rotary wing parachute device retrieving system comprising a housing having a forward end and a rearward end, a plurality of shafts, whose axes are located in a plane perpendicular to the axis of said housing, equally spaced circumferentially and similarly and rotatably mounted on a race which is rotatably and coaxially mounted on said housing, a plurality of blades fastened to members mounted on said shafts, said blades being swept forward at their centers of pressure at an angle between 1° and 20° and extending rearwards spanwise at an initial complementary coning angle of between 1° and 20°, means comprising bevel gears for interconnecting said shafts so that simultaneous and identical variation of coning angle of all the blades occurs, said device having an axis of rotation substantially coincident with the axis of said housing, and said device having a center of gravity which is located forward of the center of pressure and which cooperates with air resistant members comprising said rearwardly extending blades to orient the entire device during its free fall so that the axis of rotation of the device is substantially parallel to the direction of relative air flow.

24. A multi-bladed rotary wing parachute device comprising a housing having an axis of rotation and a forward end and a rearward end, a plurality of at least three blades symmetrically mounted to said housing on hinges whose axes are located in a plane perpendicular to said axis of rotation of said housing, said blades extending rearward spanwise at the same initial complementary coning angle and each blade having a resultant center of pressure located ahead of a radial line extending perpendicular to its hinge axis from said axis of rotation, means for interconnecting said blades so that simultaneous rotation of all the blades about said axis of rotation occurs, said device being constructed to have its center of gravity located forward of its center of pressure, whereby said device becomes oriented during its free-fall so that said axis of rotation is substantially parallel to the direction of relative air flow.

25. A two-bladed rotary wing parachute device comprising, a housing having an axis of rotation and a forward end and a rearward end, a pair of blades diammetrically mounted to said housing on hinges whose axes are located in a plane perpendicular to the axis of rotation of said housing, said blades extending rearward spanwise at the same initial complementary coning angle and each blade having a resultant center of pressure located ahead of a radial line extending perpendicular to its hinge axis from said axis of rotation, means for interconnecting said blades so that simultaneous rotation of all the blades about said axis of rotation occurs, and means extending axially from the rearward end of said housing for orienting said device during its free-fall so that said axis of rotation is substantially parallel to the direction of relative air flow.

IGOR B. BENSEN.

REFERENCES CITED

The following references are of record in the file of this patent:

UNITED STATES PATENTS

| Number | Name | Date |
| --- | --- | --- |
| 2,440,293 | Stanley | Apr. 27, 1948 |
| 2,440,294 | Campbell | Apr. 27, 1948 |
| 2,440,295 | Synnestvedt | Apr. 27, 1948 |